Nov. 17, 1936.  J. P. RATIGAN  2,061,102
ROD GRIPPING DEVICE
Filed Oct. 30, 1934
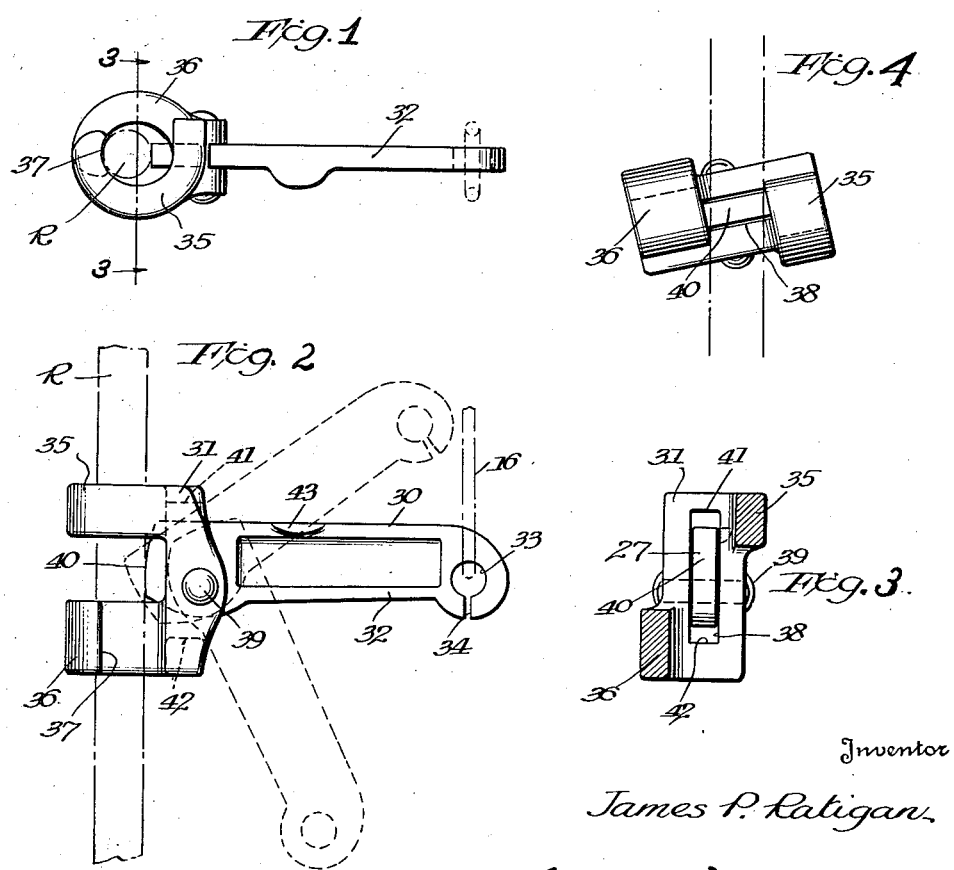
Inventor
James P. Ratigan.
By Cushman, Darby, & Cushman
Attorneys Patented Nov. 17, 1936

2,061,102

UNITED STATES PATENT OFFICE 2,061,102

ROD GRIPPING DEVICE

James P. Ratigan, Los Angeles, Calif.

Application October 30, 1934, Serial No. 750,744

13 Claims. (Cl. 24—248)

The present application relates to a rod gripping device for handling well rods or similar structures.

In drilling or pumping oil wells, when the drilling or sucker rod is removed from the well, it is customary to support the sections or stands of the rod upon a rod hanger secured to the upper portion of the well derrick.

Numerous types of gripping devices heretofore used for supporting rods upon well hangers do not grip the rod securely, or are so designed that they are very apt to be broken by the weight of the rod and may also become jammed or locked in gripping position upon the rod, requiring the use of a hammer or the like to release them from the rod. This latter procedure often damages the gripping device and, in many instances, results in breakage of the same.

One of the principal objects of the present invention is to provide a rod gripping device which is strong, positive and simple. Due to the simplicity of design, the gripping device of the invention may be readily secured to a rod. Because of its positive gripping action, all possibility of the device becoming disengaged from the rod is eliminated and danger of the rod dropping and injuring workmen is avoided.

Figure 1 is a top view of the gripping device of the invention.

Figure 2 is a side elevational view of the gripping device.

Figure 3 is a sectional view on the line 3—3 of Figure 1, and

Figure 4 is a front view of a gripping device turned to a position with respect to a well rod to permit it to be placed upon the rod.

The numeral 16 designates a chain or similar suspension member carrying the rod gripping device 30 of the present invention at its lower end. If member 18 comprises a chain, the lower link of the suspension member is positioned in an eye 33 in the outer end of the lever 32, the eye opening to the lower face of the lever through a slot of sufficient width to permit passage of the link upwardly and into the eye. After the link has been positioned in the eye 33, the slot 34 may be closed as indicated in Figure 2, by swageing the same or in any other suitable manner so that movement of the link out of the eye will be prevented. This arrangement eliminates the necessity of a special form of link to connect the gripping device 30 to the chain of the suspension member. Since the slot 34 is in the lower side of the lever and since, as will be hereinafter explained, when the gripping member is supporting a rod, all pull will be exerted against only the upper side of the eye 33, the slot 34 will have no effect toward weakening the lever.

The body portion 31 of each rod gripping device 30 is provided with upper and lower arms 35 and 36, respectively, projecting laterally therefrom, these arms preferably being curved about an axis extending parallel with the body portion 31 of the device, but the two arms being curved in opposite directions about this axis. As is best shown in Figure 1, the two arms are of sufficient length to have their outer ends 37 overlap. The space between the arms 35 and 36 is somewhat greater than the diameter of the rod to be handled by the gripping device, the space between the rods preferably being about one and one-half times the diameter of the rod. A slot 38 is formed in the body portion 31 of the gripping device and the clamping lever 32 is supported in this slot by means of a rivet 39 or the like extending through aligned apertures in the body portion 31 and the lever 32 as shown in Figure 3. It will be noted that the rivet 39 extends through the lower portion of the clamping lever, thereby causing a strong camming action to be exerted upon a rod by the inner end 40 of the lever, as will be hereinafter described. The width of the lever 32 and the length of the slot 38 in a vertical plane are such that the upward swinging movement of the outer end of the lever will be limited by the upper end 41 of the slot as shown in dotted lines in Figure 2. The downward swinging movement of the lever will be limited by the lower end 42 of the slot to the position also shown in dotted lines in Figure 2. It will be observed that in each of these positions, there will be ample room between the lever and a rod R supported in the gripping device to render it impossible for the operator's hand to be caught between the lever and the rod. Furthermore, the lever cannot move to a substantially vertical position and be locked or jammed with respect to the rod. It has been possible for this jamming action to occur in prior art devices and, when such action occurs, it is necessary to hammer or otherwise forcibly strike the lever to release the same from the rod.

The lever 32 is provided on its upper surface with a projection 43 for the purpose of indicating to the operator the upper side of the clamping device and upon which the thumb of the operator may be positioned to assist in the operation of the lever. If the thumb of the operator is positioned upon this rest, his hand will be in such position that it cannot be pinched, either with or without a rod in the device.

It will be noted that in the gripping device described above three points of engagement with a rod are provided, i. e., the arms 35 and 36 and the inner end 40 of the clamping lever. Because of the fact that the inner end of the clamping lever is between the two arms, the pressure exerted upon the rod by the clamp will be equally divided between the two arms, thereby greatly increasing the load limit of the device. Also, because the arms 35 and 36, together, completely encircle the rod, it will be impossible for the rod to swing out of position in the device.

In order to position a gripping device upon a rod R, the device is rotated in a clockwise direction (Fig. 3) and moved toward the rod to place it in the position indicated in Figure 4, with the arm 35 at one side of the rod and the arm 36 at the opposite side. The gripping device is then turned backwardly or in a counterclockwise direction so that the clamping device will occupy the position illustrated in Figure 1. Upward movement of the outer end of lever 32 will then force the upper portion of the inner end 40 of the lever into engagement with the opposed surface of the rod R and force the rod against the inner surfaces of the ends 37 of the arms 35 and 36.

The gripping device of the present invention is particularly advantageous in the handling of sections of well rod in oil well operations. Such sections are ordinarily raised from the well by an elevator apparatus. After a section has been thus raised to the desired height, the operator secures a rod gripping device to the upper portion of the section and then releases the elevator. One important advantage of the present invention is that it completely incircles a rod or the like even when it is not in clamping engagement with the rod. By this construction, the operator may position the gripping device upon the rod and permit it to slide downwardly along the rod before the elevator is released from the rod, the operator knowing that the gripping device will properly position itself without falling from the rod. Heretofore, with the single-armed gripping devices used, it has been necessary for the operator to carefully clamp each gripping device upon the rod before operating the elevator, otherwise the single-armed gripping device would fall from the rod.

Since each stand of rod is secured in a gripping device 30 of the present invention between oppositely facing arms, with a clamping device forcing the rod against the arms, there will be no possibility of the rod falling sidewise out of the device as often occurs with gripping devices provided with but one arm and a clamping means. The weight of the rod exerted downwardly will of course tend the outer end of the lever 32 to move upwardly, resulting in a strong clamping action between the upper portion of the inner end of the lever 32 against the arms 35 and 36. Also, the three point grip of the device 30 will distribute the clamping stresses so that all danger of breakage of the device under loads even greater than normal will be obviated. The three point contact of the gripping device also eliminates the necessity of providing teeth upon the inner end of the lever to prevent slippage of the rod.

In the present specification and claims, the term "rod" is intended to cover hollow tubing or piping as well as solid members.

It will be understood that the invention is not limited to the details of construction shown in the drawing and that the examples of the use of the device which have been given do not include all of the uses of which the device is capable; also, that the phraseology employed in the specification is for the purpose of description and not of limitation.

I claim:

1. A rod gripping device comprising oppositely facing fixed members each arranged to partially encircle a rod, and a clamping means between and opposed to said members, said members being spaced to permit them to be placed upon a rod when the device is turned to cause the members to straddle the rod.

2. A rod gripping device comprising a body member provided with arms extending about a common axis but in opposite directions, each of said arms being of such length as to embrace the major portion of the periphery of the rod, and means to hold a rod in contact with said arms.

3. A rod gripping device comprising a body member provided with spaced arms extending about a common axis but in opposite directions, and means pivoted between said arms to hold a rod in contact therewith.

4. A rod gripping device comprising a body member provided with spaced arms extending about a common axis but in opposite directions, and means pivoted between said arms opposite the free ends of the latter to hold a rod in contact therewith.

5. A rod gripping device comprising a body member provided with spaced curved and open arms extending about a common axis but in opposite directions, each of said arms being of such length as to embrace the major portion of the periphery of a rod, and means to hold a rod in contact with said arms.

6. A rod gripping device comprising a body member provided with spaced curved and open arms extending about a common axis but in opposite directions, and means pivoted between said arms to hold the rod in contact with said arms.

7. A rod gripping device comprising a body member provided with spaced curved and open arms extending about a common axis but in opposite directions, each of said arms being of such length as to embrace the major portion of the periphery of a rod, and means opposite the free ends of said arms to hold a rod in contact therewith.

8. A rod gripping device comprising a body member provided with spaced curved and open arms extending about a common axis but in opposite directions, and means pivoted between said arms opposite the free ends of the latter to hold the rod in contact therewith.

9. A rod gripping device comprising a body member provided with oppositely facing and open arms each arranged to partially encircle a rod, a lever pivoted on said body member between said arms to cooperate with said arms to grip a rod, and means on said body member to limit the turning movement of the lever with respect to said body member.

10. A rod gripping device comprising a slotted body, two spaced members projecting from the slotted body, each arranged to partly encircle a rod in opposite directions, and a clamping lever pivoted in the slot and bearing against the rod when the rod is gripped.

11. A rod gripping device comprising a slotted body, two spaced members projecting from the slotted body, each arranged to partly encircle a rod in opposite directions, and a clamping lever pivoted in the slot and adapted to be engaged by a suspension member to force it into gripping relation with a rod when the rod is gripped.

12. A rod gripping device comprising a body portion provided with oppositely facing curved arms, each arranged to partially encircle a rod, the free end of each arm being spaced from the body portion by a distance greater than the diameter of the rod to be gripped, and clamping means in opposed relation to said members.

13. A rod gripping device comprising a body portion provided with oppositely facing curved arms, each arranged to partially encircle a rod, the free end of each arm being spaced from the body portion by a distance greater than the diameter of the rod to be gripped, said arms being spaced longitudinally of the body portion a distance greater than the diameter of the rod to be gripped, and clamping means in opposed relation to said members.

JAMES P. RATIGAN.